United States Patent
Kuyo et al.

(10) Patent No.: US 10,081,086 B2
(45) Date of Patent: Sep. 25, 2018

(54) NOZZLE BODY, AND MACHINE TOOL TO WHICH NOZZLE BODY CAN BE ATTACHED

(71) Applicant: SUGINO MACHINE LIMITED, Uozu, Toyama Prefecture (JP)

(72) Inventors: Fujio Kuyo, Nakaniikawa-gun (JP); Kazuyuki Ishikawa, Toyama (JP); Jun Oshida, Toyama (JP)

(73) Assignee: SUGINO MACHINE LIMITED, Uozu (JP)

( * ) Notice: Subject to any disclaimer, the term of this patent is extended or adjusted under 35 U.S.C. 154(b) by 62 days.

(21) Appl. No.: 15/171,738

(22) Filed: Jun. 2, 2016

(65) Prior Publication Data

US 2017/0106485 A1 Apr. 20, 2017

(30) Foreign Application Priority Data

Oct. 16, 2015 (JP) ................................. 2015-204464

(51) Int. Cl.
*B23Q 11/10* (2006.01)
*B23Q 11/00* (2006.01)

(52) U.S. Cl.
CPC .......... *B23Q 11/103* (2013.01); *B23Q 11/005* (2013.01); *B23Q 11/0075* (2013.01);
(Continued)

(58) Field of Classification Search
CPC ............ B23Q 11/1015; B23Q 11/1025; B23Q 11/103; B23Q 11/1076; B23Q 11/005;
(Continued)

(56) References Cited

U.S. PATENT DOCUMENTS 3,726,363 A * 4/1973 Sussman .............. B23Q 11/103
184/39.1
3,791,660 A 2/1974 Bostley
(Continued)

FOREIGN PATENT DOCUMENTS

EP 0 072 657 A1 2/1983
EP 0 669 187 A2 8/1995
(Continued)

OTHER PUBLICATIONS

Mar. 17, 2017 Extended Search Report issued in European Patent Application No. 16175423.9.

*Primary Examiner* — Daniel Howell
*Assistant Examiner* — Yasir Diab
(74) *Attorney, Agent, or Firm* — Oliff PLC

(57) ABSTRACT

A nozzle body wherein replacement with cutting tool is easy and oscillation is small, and machine tool to which nozzle body can be attached, machine tool being equipped with turret having simple construction. Nozzle body includes: a body; a shank that is attached to a main spindle of machine tool: shaft body that is provided in a protruding manner on shank and rotatably supported by the body; annular path that is provided on outer circumference of shaft body; a discharge orifice that is provided at the leading end of shaft body; a first path that is provided inside shaft body and provides communication between discharge orifice and annular path; detent that is provided to the body; and a second path that is provided to the body and opens into the detent, the second path communicating with the annular path.

2 Claims, 3 Drawing Sheets

(52) U.S. Cl.
CPC ...... *B23Q 11/1023* (2013.01); *B23Q 11/1076* (2013.01); *B23Q 2220/002* (2013.01); *B23Q 2220/008* (2013.01); *B23Q 2230/002* (2013.01); *Y10T 29/5155* (2015.01); *Y10T 408/45* (2015.01); *Y10T 408/455* (2015.01); *Y10T 408/458* (2015.01); *Y10T 408/46* (2015.01)

(58) Field of Classification Search
CPC .......... B23Q 11/0075; B23Q 2220/002; B23Q 2220/008; B23Q 2230/002; Y10T 408/44; Y10T 408/45; Y10T 408/453; Y10T 408/455; Y10T 408/458; Y10T 408/46; Y10T 29/5154; Y10T 29/5155; B23B 29/24
USPC ....................................................... 184/6.14
See application file for complete search history.

(56) References Cited

U.S. PATENT DOCUMENTS

| | | | | |
|---|---|---|---|---|
| 4,442,576 A * | 4/1984 | Kitamura | ............. | B23Q 1/0018 29/39 |
| 4,557,643 A * | 12/1985 | Cioci | ................... | B23Q 1/0036 279/20 |
| 4,648,759 A * | 3/1987 | Ebenhoch | ............ | B23Q 11/103 408/59 |
| 5,265,505 A * | 11/1993 | Frechette | ............. | B23Q 1/0018 29/39 |
| 5,535,496 A * | 7/1996 | Sugino | ...................... | B08B 3/02 29/39 |
| 6,981,825 B2 * | 1/2006 | Sugata | ................. | B23Q 11/103 408/56 |
| 7,293,943 B1 * | 11/2007 | Matsumura | ............. | B23B 31/02 408/60 |
| 2004/0191012 A1 * | 9/2004 | Sugata | ................. | B23Q 11/103 408/57 |
| 2007/0177953 A1 * | 8/2007 | Matsumura | ............. | B23B 31/02 409/136 |

FOREIGN PATENT DOCUMENTS

| | | |
|---|---|---|
| GB | 2 130 931 A | 6/1984 |
| JP | S60-125046 U | 8/1985 |
| JP | 3065905 B2 | 7/2000 |

* cited by examiner

NOZZLE BODY, AND MACHINE TOOL TO WHICH NOZZLE BODY CAN BE ATTACHED

BACKGROUND

1. Field of the Invention

The present invention relates to a nozzle body attached to machine tools and a machine tool to which the nozzle body can be attached.

2. Description of the Related Art

There has been suggested a machine tool which acts as a turret-type cleaning machine (see, for example, Japanese Patent No. 3065905). The machine tool disclosed in the Japanese Patent No. 3065905 has a manifold 46 at the center of rotation of a turret 14, and supplies fluid to a nozzle 40 through a flow path 54 branching off of the manifold 46, with a valve assembly 62, a housing 66, and a shaft nozzle 74 interposed in the flow path 54. When the turret 14 is rotated to index a cleaning tool 18, a cam member 122 cams a pin 114 of the valve assembly 62 to move the valve assembly 62 to open position. On the other hand, when the cleaning tool 18 is not indexed, the valve assembly 62 is biased closed by a spring 110.

However, the machine tool of the Japanese Patent No. 3065905 has a complex construction around the turret 14 and around the periphery where the nozzle is mounted. For this reason, replacement of a valve member and a nozzle and changing between a nozzle and a cutting tool require a long time. Furthermore, the nozzle is mounted to the shaft nozzle inserted in a tool holder. In addition, since the shaft nozzle is supported by the housing 66 at a position separated from the tool holder or spindle, its rotational oscillation can increase.

SUMMARY

Accordingly, an object of the present invention is to provide a nozzle body wherein replacement with a cutting tool is easy and oscillation is small, and a machine tool which is equipped with a turret having a simple construction.

In view of the above-mentioned object, according to an aspect of the present invention provides a nozzle body. The nozzle body includes: a body; a shank that is attached to a main spindle of a machine tool; a shaft body that is provided in a protruding manner on the shank and rotatably supported by the body; an annular path that is provided on an outer circumference of the shaft body; a discharge orifice that is provided at a leading end on the opposite side of the shaft body from the shank; a first path that is provided inside the shaft body and provides communication between the discharge orifice and the annular path; a detent that is provided to the body; and a second path that is provided to the body and opens into the detent, the second path providing communication between the opening and the annular path.

According to the above-described constitution, the shank is provided, and the shaft body mounted with the discharge orifice is provided in a protruding manner on the shank mounted to the main spindle of the machine tool, thereby providing the nozzle body wherein, with the nozzle body mounted to the machine tool, oscillation is small. Furthermore, coolant is supplied to the discharge orifice through the annular path and the first path from the second path provided by forming an opening in the detent. Since the path of coolant is incorporated in the nozzle body, the mounting position thereof can be changed only by attaching or detaching the nozzle body to or from the shank hole of the main spindle.

In this nozzle body, preferably, the shaft body includes: a shaft body base portion that is provided inside the body; a cleaning nozzle that has the discharge orifice; and a fastening body that fastens the shaft body base portion and the cleaning nozzle.

Although the discharge orifice is worn by the fluid circulating therein, according to the above-described constitution, the shaft body can be split into the shaft body base portion, which is a non-consumable portion, and the cleaning nozzle, which is a consumable portion, and thus the easy-to maintain nozzle body can be provided. Also, the nozzle body having an economic advantage can be provided.

In this nozzle body, preferably, the fastening body includes: a collet that has a first taper surface on an outer surface thereof; a receptive portion into which the cleaning nozzle is inserted; an externally threaded portion that is provided to the shaft body base portion; and a nut that is screw-threaded on the externally threaded portion and fastens the collet. The receptive portion is provided to the shaft body base portion so as to surround the first path. The receptive portion has an opening, the opening having a second taper surface that abuts on the first taper surface.

According to the above-described constitution, the cleaning nozzle is inserted into the receptive portion and fastened by the collet, and thus is easily and reliably fastened to the shaft body base portion.

In this nozzle body, the shank preferably has a taper shank that fits in a main spindle hole of the main spindle and a flange portion that has a key groove. The shaft body preferably has a key that causes the cleaning nozzle and the shaft body base portion to match in phase in a rotational direction.

According to the above-described constitution, the cleaning nozzle is fixed in association with the key groove provided in the flange. The nozzle is reliably mounted at the same angle to the base point of the main spindle. Therefore, when the nozzle has directivity, the nozzle is allowed to face an object to be cleaned by indexing the angle of the main spindle. Examples of nozzles having directivity include fan-shaped spray nozzles and laterally-facing spray nozzles.

A machine tool according to the present invention is a machine tool to which the above-described nozzle body can be attached. The machine tool includes a coolant source, a turret, main spindle, a positioning block, a rotary joint, a first pipe, and a second pipe. The turret is supported rotatably about a rotational axis. The main spindle is provided to the turret and has a main spindle hole that fits the shank. The positioning block has: an insertion hole into which the detent is inserted; a first fluid outlet provided to the insertion hole; and a first fluid inlet communicating with the first fluid outlet. The positioning block is provided to the turret in such a manner that the insertion hole is adjacent to the main spindle hole. The rotary joint has: a hollow rotor provided with a second fluid outlet and fixed to the turret; and a stator provided with a second fluid inlet and supported inside the rotor so as to be rotatable about the rotational axis. The first pipe connects the second fluid inlet and the coolant source. The second pipe connects the second fluid outlet and the first fluid inlet.

According to the above-described constitution, the coolant supplied from the coolant source can be supplied to the positioning block through the rotary joint which rotates about the rotational axis of the turret. Furthermore, the turret is provided with: the main spindle that has the main spindle hole fitting the shank of the above-described nozzle body; and the positioning block into which the detent is inserted. Thus, the nozzle body can be attached to the main spindle. A tool holder with a cutting portion fixed can be also mounted to the main spindle hole, thereby allowing easy replacement of the mounting position between the tool and the nozzle body. The simple construction around the turret allows improvements in design flexibility and maintainability.

According to the present invention, it is possible to provide a nozzle body wherein replacement with a cutting tool is easy and oscillation is small. It is also possible to provide a machine tool to which the nozzle body can be attached, the machine tool being equipped with a turret having a simple construction. Since the machine tool with the nozzle body according to the present invention can function as a cleaning machine, both processes of machining and cleaning can be executed by a single unit.

BRIEF DESCRIPTION OF THE DRAWINGS

Non-limiting and non-exhaustive embodiments of the present embodiments are described with reference to the following figures, wherein like reference signs refer to like parts throughout the various views unless otherwise specified.

DETAILED DESCRIPTION

First Embodiment

Figure 1:
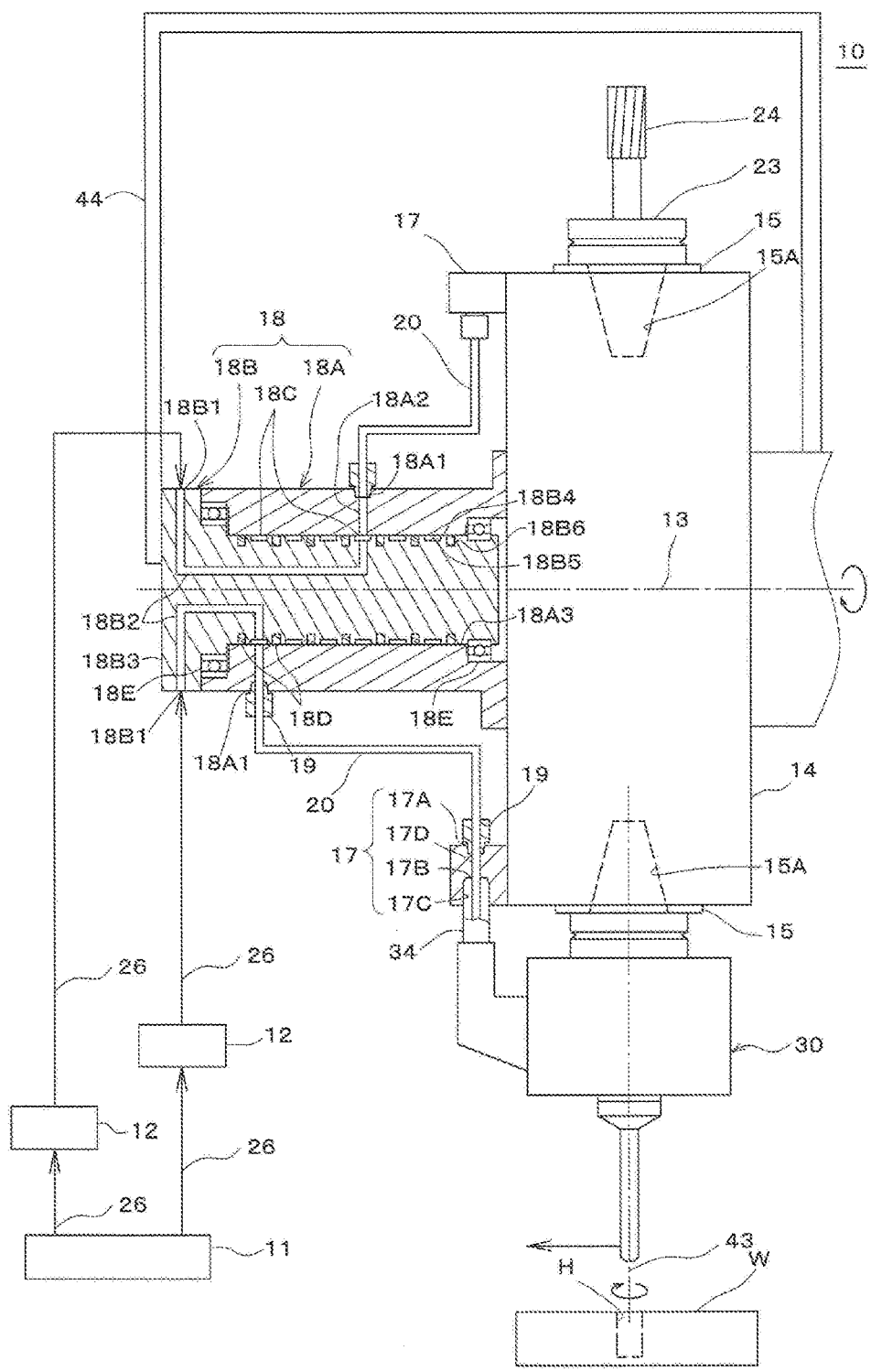
FIG. 1 is a schematic diagram showing a machine tool according to a first embodiment of the present invention.

A machine tool 10 of this embodiment will be described with reference to FIG. 1. FIG. 1 is a schematic diagram partially showing the machine tool 10 with a section taken along the vertical plane passing through a rotational axis 13 of a turret 14. The machine tool 10 is a turret-type machine tool. A machining center, a turret-type composite processing machine to which a rotary tool can be attached, etc. can be used as the machine tool 10. The turret 14 is laid across a moving device (not shown) disposed on a bed (not shown), so as to be rotatable about the rotational axis 13. A plurality of main spindles 15 are arranged on the turret 14. The main spindles 15 are each provided with a main spindle hole 15A. A rotary cutting tool 24 attached to a tool holder 23, and a nozzle body 30, to be described later, are attached to the main spindle holes 15A.

The machine tool 10 rotates the turret 14 and indexes the rotary cutting tool 24. The machine tool 10 cuts a workpiece W using the rotary cutting tool 24. After the end of the cutting work, the turret 14 is rotated to index the nozzle body 30. Then coolant supplied from a coolant source 11 is blown from the nozzle body 30 against the workpiece W, thereby cleaning the workpiece W. At this time, the machine tool 10 inserts the nozzle body 30 into, for example, a hole H made in the workpiece W while rotating the nozzle body 30, and removes chips or the like collecting on the inner surface of the hole H.

A rotary joint 18 is provided on the leading-end side (left side in FIG. 1) of the turret 14. The rotary joint 18 includes: a hollow cylindrical housing 18A that serves as a rotor; and a shaft body 18B that serves as a stator journaled in the housing 18A.

The shaft body 18B is formed in a generally cylindrical shape, and has a large-diameter flange 18B3 provided at the leading end thereof and a body portion 18B4. The shaft body 18B is supported by the housing 18A that can be rotated about the rotational axis 13 by bearings 18E. The flange 18B3 is the base end of the turret 14, and is held against rotation by a bracket 44 mounted to a nonrotational portion. The outer cylindrical surface of the body portion 18B4 is smoothly finished, and configured so as to make rotational contact with an inner cylindrical surface 18A3 of the housing 18A. A plurality of flow path grooves 18B5 constituting the wall surface of annular paths 18C are provided on the outer circumference of the body portion 18B4. The annular spaces formed by the flow path grooves 18B5 and the inner cylindrical surface 18A3 of the housing 18A form the annular paths 18C. Packing grooves 18B6 are also circumferentially provided between the flow path grooves 18B5 and outward of the outermost flow path groove 18B5 so as to be separated from the flow path grooves 18B5. The packing grooves 18B6 are each provided with ring packing 18D. The flange 18B3 is provided with the same number of fluid inlets 18B1 as the paths 18C. The shaft body 18B is provided with the same number of U-shaped paths 18B2 as the fluid inlets 18B1, each of the paths 18B2 providing communication between one of the fluid inlets 18B1 and one of the paths 18C.

The housing 18A is fixed to the turret 14 so as to rotate about the rotational axis 13. The housing 18A is equipped with the smoothly-finished inner cylindrical surface 18A3. The bearings 18E are provided at either end of the inner cylindrical surface 18A3. The bearings 18E support the flange 18B3 of the shaft body 18B and a leading-end portion of the body portion 18B4. Paths 18A2 are each provided in a manner penetrating the housing 18A from the outer peripheral surface of the housing 18A to the inner cylindrical surface 18A3 so as to face the paths 18B2 of the shaft body 18B when the rotary joint 18 is assembled. The outer opening of the path 18A2 serves as a fluid outlet 18A2 (second fluid outlet). That is, the path 18A2 provides communication between one of the paths 18C and one of the fluid outlets 18A1.

Each of the fluid inlets 18B1 (second fluid inlets) communicates with one of the fluid outlets 18A1 through the corresponding path 18C. Fluid, serving as coolant, flows into the fluid inlet 18B1 provided in the shaft body 18B. The fluid flowing into the fluid inlet 18B1 passes through the path 18B2, the path 18C, and the path 18A2 and flows out from the fluid outlet 18A1 provided in the outer peripheral surface of the housing 18A. Since the shaft body 18B is fixed by the bracket 44, the fluid inlet 18B1 does not rotate. Therefore, the fluid inlet 18B1 can be easily fixed to the coolant source 11 and a pipe (first pipe) 26, including a rubber hose, metal pipe and others. Furthermore, the fluid outlet 18A2 is fixed to the turret 14. Therefore, a fixed pipe can be used as a pipe 20.

It should be noted that the flow path grooves 18B5 forming the paths 18C, the packing grooves 18B6, and the packing 18D are provided to the shaft body 18B or alternatively, may be provided to the housing 18A.

A positioning block 17 is provided to the turret 14 so as to be adjacent to the main spindle hole 15A. The positioning block 17 is provided with an insertion hole 17C into which a detent 34 (see FIG. 2) of the nozzle body 30 is inserted. The insertion hole 17C is provided parallel to the main spindle hole 15A. A path 17D is provided for communication between a fluid outlet 17B (first fluid outlet) provided in the bottom face of the insertion hole 17C and a fluid inlet 17A (first fluid inlet) provided in the outer surface of the positioning block 17. The insertion hole 17C is provided with a seal 17E (see FIG. 2) that seals the clearance between the insertion hole 17C and the inserted detent 34.

The pipe (second pipe) 20 connects the fluid outlet 18A1 of the rotary joint 18 and the fluid inlet 17A of the positioning block 17. The pipe 20 has both ends fixed by adapters 19. Since the pipe 20 rotates integrally with the turret 14, a strong fixed pipe, such as a metal pipe, can be used as the pipe 20.

It should be noted that, although the pipe 20 is provided, a path passing through the interior of the rotary joint 18 and the turret 14 may be provided in place of the pipe 20.

The machine tool 10 is also equipped with: the coolant source 11; and valves 12, including solenoid valves, flow-path switching valves and others. The coolant source 11 includes a coolant tank (not shown) and a coolant pump (not shown). The coolant tank is equipped with a separation unit (not shown) that separates the chips recovered from a machining area and coolant liquid. The coolant pump supplies coolant with a pressure suitable for cleaning to the fluid inlets 18B1 of the rotary joint 18. The same number of valves 12 as the positioning blocks 17 to which coolant is supplied are provided. The pipes (first pipes) 26, including rubber hoses, metal pipes and others, are connected between the coolant source 11 and respective ones of the valves 12 and between the valves 12 and the fluid inlets 18B1. The valves 12 switch between the positioning blocks 17, depending on which of the positioning blocks 17 is to be supplied with the coolant from the coolant source 11.

It should be noted that, in place of the same number valves 12, serving as a plurality of opening/closing valves, as the positioning blocks 17 to which coolant is supplied, one directional control valve may be provided so as to allow switching between the positioning blocks 17 to be supplied with coolant.

Figure 2:
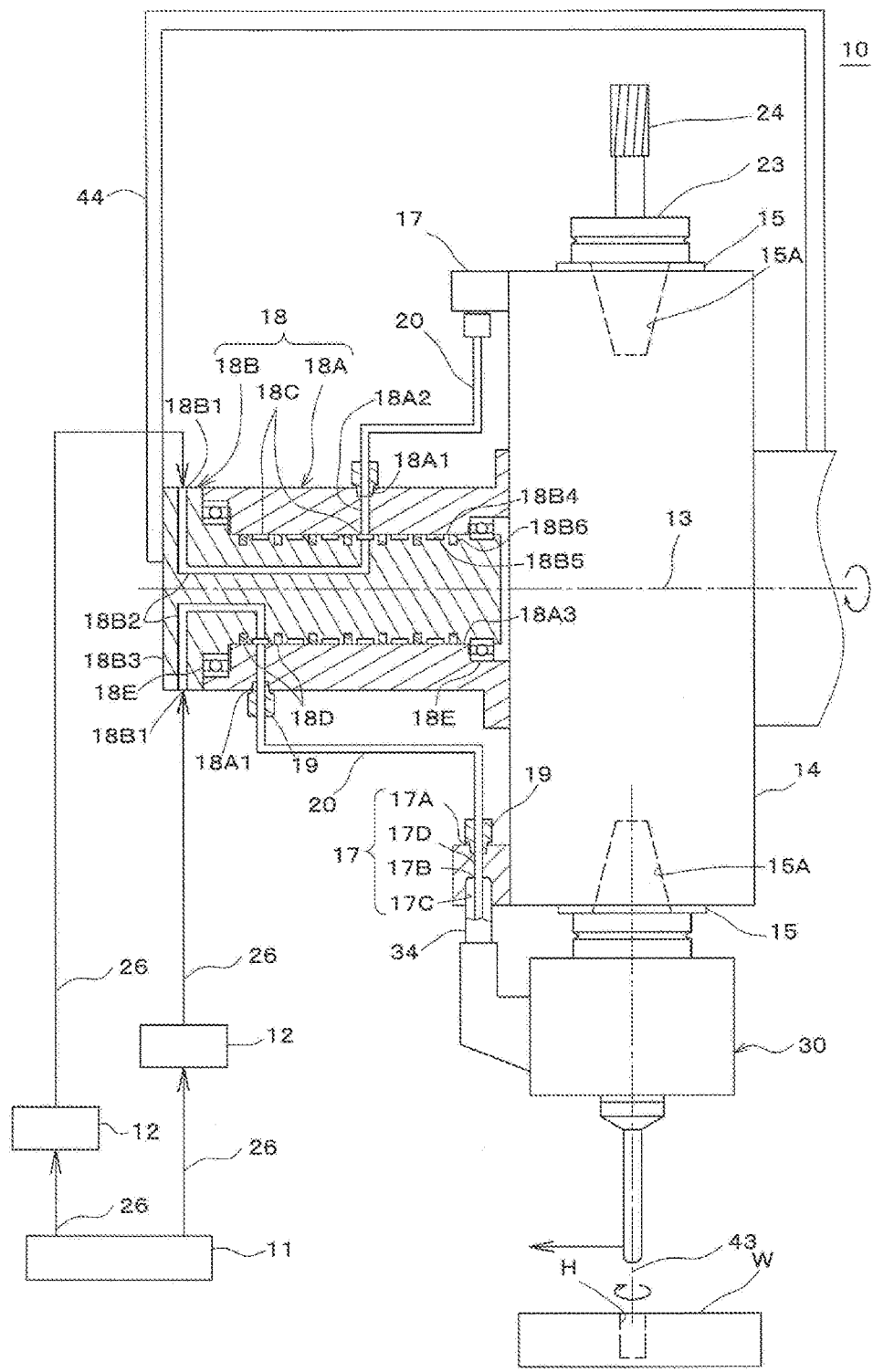
FIG. 2 is a longitudinal sectional view showing a nozzle according to the first embodiment of the present invention.

Referring to FIG. 2, the nozzle body 30 will be described. The nozzle body 30 is configured to be attached to the machine tool 10. The coolant supplied from the coolant source 11 is discharged from a discharge orifice 33D to clean the workpiece W (see FIG. 1). The nozzle body 30 is equipped with a rotational shaft body 33, and is capable of indexing the direction of the discharge orifice 33D and rotating. The nozzle body 30 can be attached not only to the turret-type machine tool 10 but also to automatic-tool-changing-type machine tools.

A shank 31 is equipped with: a taper shank 31A that can be attached to the main spindle hole 15A; and a flange portion 31B. The flange portion 31B is provided with a key groove 31C for aligning the phase of the shank 31 with the main spindle hole 15A when attaching the shank 31 to the main spindle hole 15A.

A body 32 is a casing surrounding the shaft body 33, and is equipped with the detent 34 that is inserted through the insertion hole 17C of the positioning block 17 provided to the machine tool 10. The body 32 is provided with a cylindrical through-hole into which the shaft body 33 is inserted. A smoothly-finished cylindrical surface 32B is provided at the center of the through-hole. The cylindrical surface 32B is provided with a flow path groove 32C. Bearings 35 are provided at either end of the cylindrical surface 32B. The detent 34 is formed in a hollow cylindrical shape. The detent 34 is configured to be inserted into the insertion hole 17C, with the outer peripheral surface thereof fitting in the insertion hole 17C, when the nozzle body 30 is attached to the main spindle hole 15A. An L-shaped path 36 (second path) is provided so as to pass through the interior of the body 32 from the end surface of the detent 34 and communicate with the flow path groove 32C.

The shaft body 33 is formed in a generally cylindrical shape. The shaft body 33 is protrusively provided on the shank 31 in such a manner as to pass through the body 32 and protrude long in the opposite direction to the shank 31. The shaft body 33 is rotatably supported by the body 32 through the bearings 35. The shaft body 33 is split in two bodies in the vicinity of the lower end of the body 32, the two bodies being coupled together by bolts 33C serving as fastening bodies. The body-side portion of the shaft body 33 serves as a shaft body base portion 33A. The leading-end side (lower side in the figure) of the shaft body 33 serves as a cleaning nozzle 33B equipped with the discharge orifice 33D.

The shaft body base portion 33A is formed integrally with the shank 31. A receptive portion 33A1 is provided coaxially with the rotational axis 43 in the center of the leading-end-side end surface of the shaft body base portion 33A. The receptive portion 33A1 is formed with a key groove 41. A body portion 33A2 serving as a supporting portion of the shaft body base portion 33A is smoothly formed so as to make contact with the cylindrical surface 32B. The space formed between the outer surface of the body portion 33A2 and the flow path groove 32C serves as an annular path 37. That is, the annular path 37 is provided so as to go around the circle on the outer circumference of the body portion 33A2.

As shown in FIG. 2, the body portion 33A2 of the shaft body base portion 33A may be provided with a circumferential groove which faces the flow path groove 32C of the body 32. In this case, the ring-shaped space defined by two circumferential grooves of the flow path groove 32C provided in the body 32 and the circumferential groove provided in the shaft body base portion 33A forms the annular path 37. An inverted L path 39 (first path) is provided in such a manner as to extend radially from the annular path 37 and extend in the axial direction of the main spindle 15 along the rotational axis 43 to the vicinity of the leading end of the shaft body 33. The receptive portion 33A1 is provided so as to surround the path 39.

It should be noted that the annular path 37 need only be provided on the outer periphery of the shaft body 33, and the groove surface constituting the annular path 37 may be either on the body 32 or on the shaft body 33. Furthermore, the path 39 may be formed in a T shape in which the radially-extending portion of the path 39 is provided so as to pass through the body portion 33A2 and open into the annular path 37 on both sides of the body portion 33A2.

Annular packing grooves 32A are provided on either side of the annular path 37 of the cylindrical surface 32B so as to be separated from the annular path 37. Each of the packing grooves 32A is provided with ring packing 38. The packing 38 prevents leakage of coolant so as to prevent damage to the bearings 35 caused by the outflow of oil from the bearings 35. The structure and type of the packing 38 are selected in accordance with the temperature, pressure, and chemical properties of the coolant.

It should be noted that the packing grooves 32A may be provided on the shaft body 33 in place of the body 32.

Preferably, a scraper 42 or packing is provided between the body 32 and the shaft body 33 on the outer periphery of the body 32. If both of the scraper 42 and the packing are mounted, the scraper 42 is provided on the outer side of the body 32, and the packing is provided toward the inner side of the body 32.

The cleaning nozzle 33B includes: a flange 33B2; and a shaft portion 33B3 provided so as to extend along the rotational axis 43 from the flange 33B2. An insertion portion 33B1 is provided in a protruding manner on the flange 33B2. The insertion portion 33B1 is configured to fit in the receptive portion 33A1 of the shaft body base portion 33A. The insertion portion 33B1 is provided with the key groove 41. The flange 33B2 is provided with stepped holes 33B4 into which the bolts 33C are inserted. The path 39 is provided along the center of the cleaning nozzle 33B from the insertion portion 33B1 to the leading end of the cleaning nozzle 33B. The leading end of the cleaning nozzle 33B is provided with the discharge orifice 33D. The discharge orifice 33D communicates with the path 39.

The cleaning nozzle 33B is positioned by inserting a key 40 into the key groove 41 and inserting the insertion portion 33B1 into the receptive portion 33A1 of the shaft body base portion 33A. Furthermore, the cleaning nozzle 33B is fixed to the shaft body base portion 33A from the flange 33B2 by the bolts 33C.

The cleaning nozzle 33B is fixed to the shaft body base portion 33A, with the direction and mounting height thereof positioned by the key 40 and the flange 33B2, respectively. Therefore, even if the discharge orifice 33D has directivity, the cleaning nozzle 33B is precisely fixed without causing the displacement of the discharge orifice 33D due to the replacement of the cleaning nozzle 33B. Since the flange portion 31B of the shank 31 is also equipped with the key groove 31C, the positions of the main spindle 15 and the discharge orifice 33D are precisely indexed if the position of the nozzle body 30 is limited by the key groove 31C when the nozzle body 30 is attached to the main spindle 15. By these actions, even if the nozzle body 30 having directivity is used, the mounting angle and position thereof are precisely maintained.

Furthermore, the inclination of the cleaning nozzle 33B is restricted by the mounting surfaces of the flange 33B2 and the shaft body base portion 33A. Further, the shank 31 and the shaft body base portion 33A are integrally formed. Thus, the nozzle body 30 of this embodiment is greatly reduced in rotational oscillation and assembled such that the height of the discharge orifice 33D is positioned with high accuracy with respect to the shank 31.

Preferably, packing, including an O-ring and others, is provided between the cleaning nozzle 33B and the shaft body base portion 33A. Furthermore, if the cleaning nozzle 33B has no directivity or if the cleaning nozzle 33B is a so-called spray lance and rotationally inserted, it is unnecessary to provide the key groove 41 and the key 40.

Advantageous Effects

The nozzle body 30 of this embodiment can be attached to any machine tool which is equipped with the main spindle hole 15A and the positioning block 17. If the coolant used for machining is supplied to the positioning block 17, the nozzle body 30 can be readily used as a machine tool equipped with a cleaning function.

The nozzle body 30 has a high degree of accuracy of its oscillation and position because the shaft body 33 rotates integrally with the shank 31. Furthermore, since the workpiece is fixed to the machine tool 10 with high accuracy and the nozzle body 30 is directly attached to the machine tool 10, the cleaning nozzle 33B can be inserted without interference with the workpiece W even in a region where there is only very little clearance when the cleaning nozzle 33B of the nozzle body 30 is inserted into the hole H of the workpiece W.

The discharge orifice 33D provided in the cleaning nozzle 33B is worn by the fluid discharged from the discharge orifice 33D. Since the cleaning nozzle 33B is a consumable and configured removably from the non-consumable shaft body base portion, the nozzle body 30 is easy to maintain.

The machine tool 10 supplies coolant to the nozzle body 30 through the positioning block 17, and the nozzle body 30 can be directly attached to the main spindle hole 15A. Therefore, the mounting position of the cleaning nozzle 33B and the mounting position of the rotary cutting tool 24 can be changed simply by changing the mounting place of the nozzle body 30.

In the machine tool 10, the coolant used for machining is used for cleaning as it is, and therefore only one coolant source 11 for retaining and supplying the coolant is enough. Of course, one coolant tank (not shown) is also sufficient. Since a cleaning machine and a processing machine are integrated into a single machine, the nozzle body and machine tool according to this embodiment allow shortening of the process line. Since accessory equipment, such as the coolant tank, is reduced, the setting area of the process line can be reduced.

The destination of coolant is switched by the valves 12 separated from the turret 14. The valves 12 are separated from the turret 14, and therefore can be provided at a position isolated from the processing region, for example, outward of a splash cover of the machine tool 10. Since the valves 12 equipped with electrical contacts or the like are provided in isolation from the processing region, it is possible to prevent the valves 12 from being damaged by the splattering of coolant, oil, and chips or the like contained in the coolant. Since the valves 12 are consumables, the replacement thereof is facilitated.

The path of coolant only includes the pipe 26, the rotary joint 18, the pipe 20, and the positioning block 17, all of which are arranged outside the turret 14. Thus, the pressure-resistant design and effective sectional area of the path can be freely designed. Therefore, the flow rate and pressure of the coolant can be properly selected in accordance with a required cleaning capacity.

Second Embodiment

Figure 3:
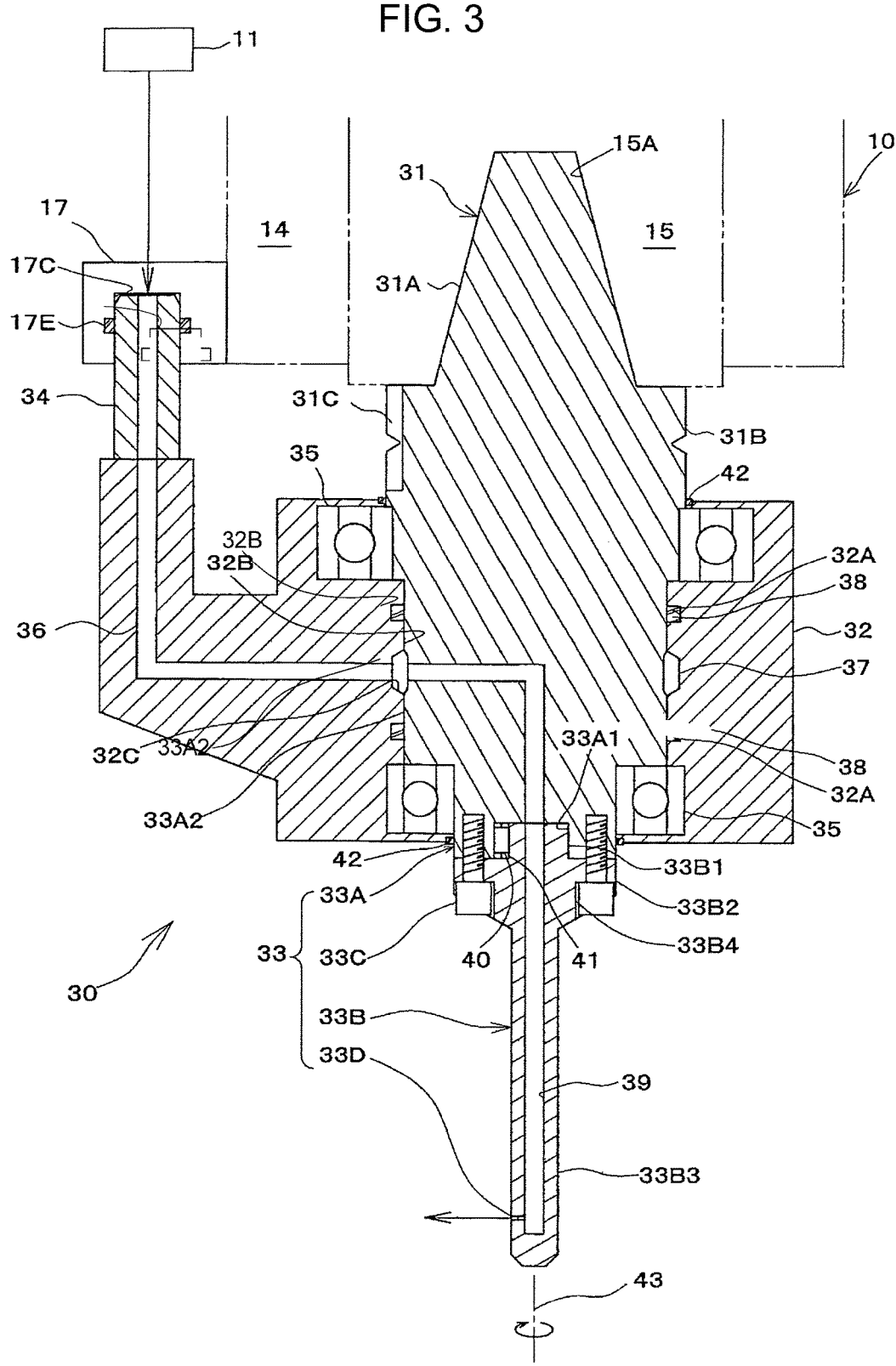
FIG. 3 is a longitudinal sectional view showing a nozzle according to a second embodiment of the present invention.

Referring to FIG. 3, a nozzle body 50 according to the second embodiment of the present invention will be described. The same configuration as the nozzle body 30 of the above-described first embodiment is denoted by the same reference sign and will not be described here.

The nozzle body 50 includes a shaft body 53, which includes a shaft body base portion 53A, a cleaning nozzle 53B, and a collet fastening body 53C serving as a fastening body.

The cleaning nozzle 53B is formed in a generally pipe shape and provided with the path 39 in the center thereof. Discharge orifices 53D communicating with the path 39 are provided on the same level in the leading end of the cleaning nozzle 53B so as to divide the circle in two. The cleaning nozzle 53B is a so-called cleaning lance which is inserted into the hole H while rotating. The cleaning nozzle 53B has no directivity.

A receptive portion 53A1 into which the cleaning nozzle 53B is inserted is provided at a leading end portion (lower side in the figure) of the shaft body base portion 53A. The receptive portion 53A1 is provided so that the cleaning nozzle 53B fits therein with the rotational axis 43 as the center. A taper surface 53C2 (second taper surface) is provided to the opening of the receptive portion 53A1. An externally threaded portion 53C3 is provided on the outer circumference of the leading end portion of the shaft body base portion 53A.

A collet 53C4 is equipped with a taper surface (first taper surface) 53C5 that abuts on the taper surface 53C2. The collet 53C4 is provided with a radial groove (not shown) on the inner and outer circumference thereof. The collet 53C4 is tightened against the externally threaded portion 53C3 from the leading-end side by a nut 53C6. At this time, the taper surface 53C5 of the collet 53C4 is reduced in diameter along the taper surface 53C2 of the shaft body base portion 53A by tightening the nut 53C6, so that the inner diameter of the collet 53C4 is reduced. The inner surface of the collet 53C4 is biased against the cleaning nozzle 53B by the tightening force of the nut 53C6, and thus the cleaning nozzle 53B is fixed to the shaft body base portion 53A.

The height of the discharge orifices 53D can be adjusted by measuring the height from the flange 31B, inserting the cleaning nozzle 53B, and tightening the nut 53C6. Furthermore, at this time, the directions of the discharge orifices 53D can be also adjusted in accordance with the key groove 31C, and fixed by tightening the nut 53C6. As shown in FIG. 3, the cleaning nozzle 53B may of course be fixed in abutting relation to the end surface of the receptive portion 53A1 so that the height of the discharge orifices 53D is held constant.

It should be noted that, also in this embodiment, a key may be provided between the shaft body base portion 53A and the cleaning nozzle 53B. In this case, the rotational direction of the cleaning nozzle 53B is positioned with respect to the shaft body base portion 53A by the key.

What is claimed is:

1. A machine tool comprising:
   a nozzle body having:
      a body;
      a shank that is attached to a main spindle of a machine tool;
      a shaft body base portion being provided inside the body, the shaft body protruding from the shank and rotatably supported by the body;
      a cleaning nozzle arranged on the shaft body;
      a fastening body configured to fasten the shaft body base portion and the cleaning nozzle;
      a first annular path being provided on an outer circumference of the shaft body;
      a discharge orifice being provided at a leading end on the opposite side of the cleaning nozzle from the shank;
      a first path being provided inside the shaft body, the first path providing communication between the discharge orifice and the annular path;
      a detent being provided to the body; and
      a second path being provided to the body and opens into the detent, the second path configured to provide communication between the opening and the annular path;
   a coolant source;
   a turret that is supported rotatably about a rotational axis;
   main spindles that are provided to the turret and has a main spindle hole to which the shank is attached;
   positioning blocks that have: an insertion hole into which the detent is inserted; a first fluid outlet provided to the insertion hole; and a first fluid inlet communicating with the first fluid outlet, the positioning block being provided to the turret in such a manner that the insertion hole is adjacent to the main spindle hole;
   a rotary joint that has:
      a hollow rotor provided with second fluid outlets and fixed to the turret;
      a stator provided with second fluid inlets and supported inside the rotor so as to be rotatable about the rotational axis;
   second annular paths formed by a flow path groove arranged on the stator and a inner surface of the rotor;
   third paths being provided inside the stator, the third paths providing communication between the second fluid inlets and the second annular paths; and
   fourth paths being provided inside the rotor, the fourth paths providing communication between the second annular paths and the second fluid outlets;
   first pipes that connect the second fluid inlets and the coolant source;
   valves each being connected between the coolant source and the second fluid inlets; and
   second pipes that connect each of the second fluid outlets and the first fluid inlet.

2. The nozzle body according to claim 1, wherein the shank has a taper shank that fits in a main spindle hole of one of the main spindles and a flange portion that has a key groove, and
   the shaft body has a key that causes the cleaning nozzle and the shaft body base portion to match in phase in a rotational direction.

* * * * *